United States Patent

[11] 3,629,782

[72] Inventor Ravinder J. Sahni
Hopewell Junction, N.Y.

[21] Appl. No. 78,437
[22] Filed Oct. 6, 1970
[45] Patented Dec. 21, 1971
[73] Assignee Cogar Corporation
Wappingers Falls, N.Y.

[54] RESISTOR WITH MEANS FOR DECREASING CURRENT DENSITY
10 Claims, 9 Drawing Figs.

[52] U.S. Cl. 338/308, 317/235 D, 338/311, 338/328, 338/333
[51] Int. Cl. H01c 7/00
[50] Field of Search 338/308, 307, 309, 311, 333, 328; 317/235 D, 235 E, 235 F

[56] References Cited
UNITED STATES PATENTS

| | | | |
|---|---|---|---|
| 2,666,814 | 3/1954 | Shockley | 317/235 E |
| 3,411,947 | 11/1968 | Block | 338/308 X |
| 3,506,771 | 4/1970 | Cole | 338/333 X |
| 3,492,513 | 1/1970 | Hollander | 317/235 D |

*Primary Examiner*—E. A. Goldberg
*Attorney*—Harry M. Weiss

ABSTRACT: Semiconductor and cermet or thin film resistors employ thin film contacts of aluminum and the like. Failure of these resistors at the positive terminal due to electromigration is virtually eliminated by special designs for decreasing current density at the positive end of the resistor. The width of the resistor at its positive end, and its associated contact is made larger than at the negative end. With semiconductor resistors, a more heavily doped diffusion is used at the positive end.

INVENTOR
RAVINDER J. SAHNI
BY Joseph L. Spiegel
Harry M Weiss
ATTORNEYS

RESISTOR WITH MEANS FOR DECREASING CURRENT DENSITY

BACKGROUND OF THE INVENTION

1. Field of the Invention

This invention relates to resistors which employ very thin and narrow films of metal as contacts. Included are semiconductor resistors and cermet or thin film resistors. Such resistors are known to fail due to electromigration at the positive terminal and the invention is directed to a solution to this problem.

2. Description of the Prior Art

In forming semiconductor integrated circuit devices both active circuit elements such as transistors, passive circuit elements such as resistors, and their interconnections are formed within or on the surface of a slice of semiconductor material, typically silicon.

Generally speaking, the semiconductor resistors are of two types, P-type and N-type. In the case of the P-type, the resistive element is formed concurrently with formation of the base of a transistor by diffusing a P-type impurity such as boron into an N-type region. With N-type resistors, on the other hand, the resistive element is formed concurrently with formation of the emitter of a transistor by diffusing an N-type impurity into P-type regions on the wafer.

Subsequently, electrical connection to both ends of the resistive element is established. Typically, this is a thin and narrow film of metal such as aluminum 1—3 microns thick and 0.2 to 1.0 mil. wide.

Cermet resistors such as chromium-silicon monoxide resistors are formed by vacuum depositing a thin film of resistive material on a substrate and forming contacts thereto. These contacts, too, can be quite thin and narrow.

It is well known that such resistors are subject to failure at the contact-resistive element interface, and that the cause of such failures is due to electromigration. Electromigration can be defined as the mass transport of metal under the influence of high current.

It is also known that such failures occur at the positive end of the resistor. This can be seen from the following. Where electromigration occurs, the mass transport of metal takes place in the direction of the electron flow.

Therefore, for resistors carrying large currents, there is a buildup of aluminum at the negative terminal and depletion at the positive terminal. A vacancy develops at the contact-resistive element interface of the positive terminal which, with time, spreads to an electrical open.

SUMMARY OF THE INVENTION

An object of the invention is an improved resistor.

Another object is such a resistor whose failure rate due to electromigration is greatly decreased.

Still another object is decreased space requirements for resistors.

These and other objects are accomplished in accordance with the present invention by special design for decreasing current density at the positive end of the resistor. The width to the resistor at its positive end, and its associated contact is made larger than at the negative end. Also, where the resistor is of the semiconductor variety, a more heavily doped diffusion can also be used at the positive end.

DESCRIPTION OF THE DRAWING

The foregoing and other objects, features and advantages of the invention will be apparent from the following more particular description of the preferred embodiments of the invention as illustrated in the accompanying drawing, wherein.

DESCRIPTION OF THE PREFERRED EMBODIMENTS

The teachings of the present invention may be used to advantage in cases where resistors have extremely thin and narrow contacts, on the order of 1–3 microns thick and 0.2 to 1.0 mil. wide and carry heavy current densities, on the order of 50,000 a./cm.$^2$ and higher. The application to semiconductor resistors will first be described.

Figure 1:
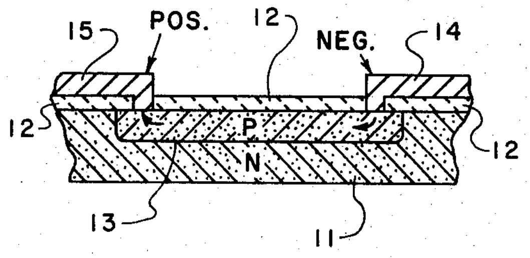
FIG. 1 PRIOR ART
FIG. 1 shows a cross-sectional schematic view of a prior art semiconductor resistor.
Figure 2:
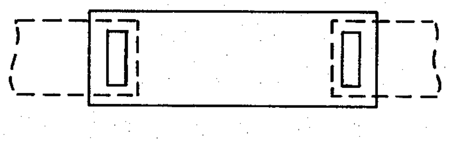
FIG. 2 PRIOR ART
FIG. 2 is a top view of the prior art semiconductor resistor illustrated in FIG. 1.

It is known to form resistors within a body of semiconductive material. Referring first to FIGS. 1 and 2 of the drawing, a prior art semiconductor resistor is illustrated.

Although for the purpose of describing this resistor, reference is made to a configuration wherein an N-type region is utilized and subsequent semiconductor regions are formed in the conductivity types shown in the drawing, it is readily apparent that the regions can be of opposite conductivity type. Furthermore, some operations described as diffusion operations can be made by epitaxial growth.

In FIGS. 1 and 2 there is illustrated an N-type region 11 of a substrate, preferably having a resistivity of 0.20 to 1.0 ohms-centimeter. The substrate is preferably a monocrystalline silicon structure which can be fabricated by conventional techniques such as by pulling a silicon semiconductor from a melt containing the desired impurity concentration and then slicing the member into wafers or substrates. Thereafter region 11 is formed as by diffusion or epitaxial growth.

An oxide coating 12, preferably silicon dioxide, is either thermally grown or formed by pyrolitic deposition techniques. Alternatively, an RF sputtering technique may be employed.

After standard photolithographic masking and etching techniques are employed, a diffusion operation is carried out to diffuse into region 11 a P-type region 13. Preferably, boron is the diffusant. When forming integrated circuit devices, this operation is conveniently carried out simultaneously with the formation of the base region of a transistor.

As an alternative, the P-type region 13 can be formed by etching out a channel in the N-type region 11 and then subsequently growing a P-type region 13.

The oxide layer 12 is reformed on the surface of region 11, including over P-type region 13. A pair of holes is then opened to permit formation of metal ohmic contacts 14, 15. The ohmic contacts 14, 15 are preferably formed by evaporation of a layer of aluminum and then subtractively removing undesired portions leaving the desired metal land portions 14, 15 on the surface of the oxide layer 12 and in contact with the P-type region 13. This completes the resistor with P-type region serving as the resistive element and contacts 14, 15 as its terminals.

As noted previously such semiconductor resistors are subject to failure and the cause of such failure is due to electromigration. Also, where electromigration occurs, the mass transport of metal takes place in the direction of electron flow. Therefore, for resistors carrying large currents, there is a buildup of aluminum at the negative terminal end and depletion at the positive end.

Referring more particularly to FIG. 1, the arrow shows the direction of the flow of the electrons in the resistor. When electromigration sets in near the negative end of the resistor, the aluminum ions are carried in the direction of the arrow until they meet the aluminum-silicon interface. From that point they cannot go any further and, therefore, buildup of aluminum results. However, on the positive end, electromigration carries aluminum away from the contact. Since there is no aluminum below the contact to replace the migrated aluminum, a vacancy develops which, with time, spreads to an electrical open.

Figure 3:
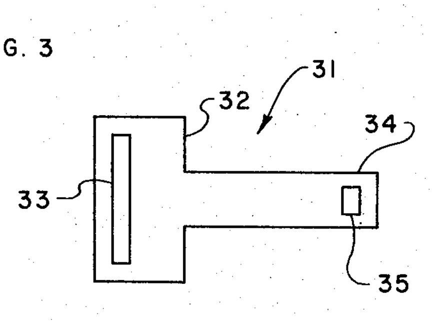
FIG. 3 is a top schematic view of a first embodiment of the invention showing a semiconductor resistor with an enlarged, rectangular positive end.
Figure 4:
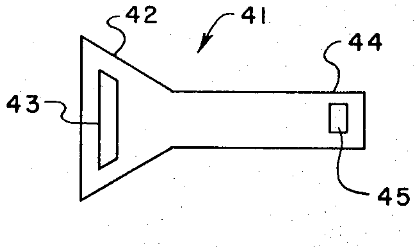
FIG. 4 is a top schematic view of a second embodiment of the invention showing a semiconductor resistor with an enlarged, truncated, triangular positive end.

The solution to this problem in accordance with this invention, is to decrease current density at the positive end of the resistor. Thus, referring to FIGS. 3 through 5, the current density may be decreased geometrically by increasing the width of the resistor at the positive end, as well as its associated contact relative to the width of the negative end of the resistor and its associated terminal. Referring in particular to FIG. 3, the resistor 31 is seen to have a positive end 32, generally rectangular in shape and associated terminal 33 of large width compared to the negative end 34 of the resistor and its associated terminal 35. FIG. 4 is similar to FIG. 3 in that the positive end 42 and associated terminal 43 of resistor 41 are of a width much larger than the negative end 44 and terminal 45 of the resistor. However, the positive end is shown to be truncated triangular shaped.

Figure 5:
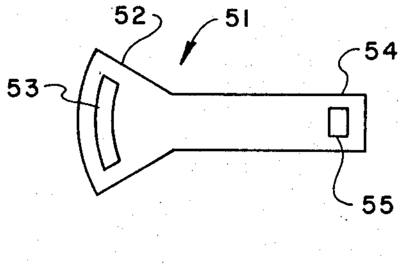
FIG. 5 is a top schematic view of a third embodiment of the invention showing a semiconductor resistor with an enlarged, circular positive end.

FIG. 5 is similar to FIGS. 4 and 3 in that the width of the positive end 52 of the resistor 51 as well as its associated terminal 53 are much larger than the negative end 54 of the resistor and its associated terminal 55. However, in this case, the positive end is circular shaped.

Figure 6:
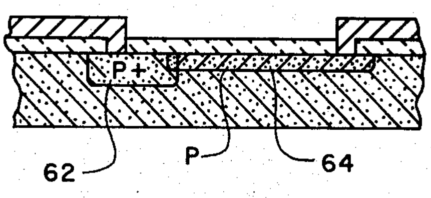
FIG. 6 is a cross-sectional, schematic view of a fourth embodiment of the invention showing a semiconductor resistor with an enlarged, rectangular positive end and with a more heavily doped region at its positive end.
Figure 7:
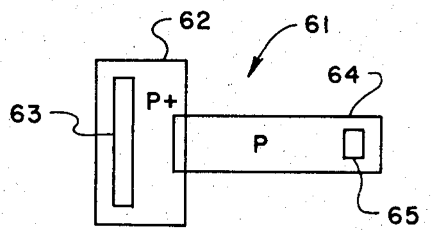
FIG. 7 is a top view of the resistor illustrated in FIG. 6.

FIGS. 6 and 7 illustrate a further embodiment of the invention. Geometrically, the embodiment is similar to the FIG. 3 embodiment in that the resistor 61 has a positive end 62, generally rectangular in shape, and associated terminal 63 of large width compared to the negative end 64 and its associated terminal 65. The negative end 64 of the resistive element is formed in the usual manner as by using an impurity of boron of $7\times10^{18}$ atoms/cm.$^3$ concentration. However, a more heavily doped impurity, typically boron of $1\times10^{20}$ atoms/cm.$^3$ concentration is used to form the positive end 62 of the resistive element. The embodiment disclosed in FIGS. 6 and 7 has the additional advantage that the current is more evenly distributed as it leaves the positive terminal 63 because of lower sheet resistance for the more heavily doped diffusion.

Figure 8:
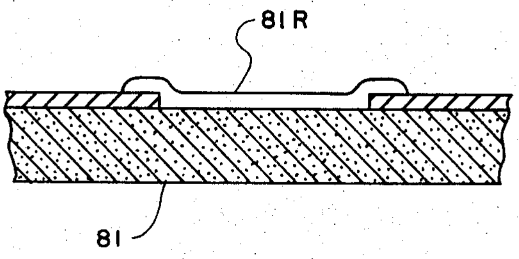
FIG. 8 is a cross-sectional schematic view of a cermet resistor incorporating the teachings of the present invention; and, FIG. 9 is a top view of the cermet resistor illustrated in FIG. 8.
Figure 9:
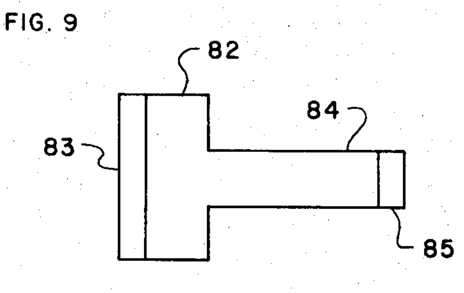

The previous discussion has centered on semiconductor resistors. However, the teachings are applicable to other type resistors which employ extremely small contact elements such as cermet resistors. Thus, referring to FIGS. 8 and 9, there is shown a substrate 81 which might be glass, aluminum oxide, silicon and the like. A resistor 81R is formed on the surface of the substrate. The resistive element comprises cermet material such as vacuum deposited silicon monoxide. The resistor is seen to have a positive end 82, generally rectangular in shape and associated terminal 83 of a width large compared to the negative end 84 and its associated terminal 85.

While the invention has been particularly described and shown with reference to the preferred embodiments thereof, it will be understood by those skilled in the art that various changes in form and detail and omissions may be made therein without departing from the spirit and scope of the invention.

What is claimed is:

1. A semiconductor resistor with improved reliability comprising:
   semiconductive material with a region of first conductivity type;
   a second region within said first region of second conductivity type forming a resistance;
   said second region having a positive and a negative end;
   the positive end of said second region being larger in width than the negative end; and,
   terminal means connected to the positive and negative ends of said second region corresponding in width to their said respective ends.

2. A semiconductor resistor with improved reliability comprising:
   a semiconductive material with a region of first conductivity type;
   a resistance region of second conductivity type formed within said first region and having a positive and negative end;
   said second region being more heavily doped at said positive end than said negative end; and,
   terminal means connected to the positive and negative ends of said resistance region.
3. A resistor with reduced susceptibility to failure due to electromigration comprising:
   a resistive element having a positive and negative end;
   terminal means connected to the positive and negative ends of said element; and,
   means for decreasing current density at the positive end of said resistor, said positive end of said resistive element and its associated terminal is large in width compared to the width of the negative end of said resistive element and its associated terminal.
4. A resistor with reduced susceptibility to failure due to electromigration comprising:
   a resistive element having a positive and negative end;
   terminal means connected to the positive and negative ends of said element;
   means for decreasing current density at the positive end of said resistor; and,
   including a substrate of semiconductive material with a region of a first conductivity type, and said resistive element comprises a second region within said first region of opposite conductivity type.
5. The invention defined by claim 4 wherein the positive end of said second region of opposite conductivity type and its associated terminal is large in width compared to the width of the negative end of said second region and its associated terminal.
6. The invention defined by claim 5 wherein the positive end of said second region is more heavily doped than the negative end of said second region.
7. The invention defined by claim 4 wherein said positive terminal means is a thin film of metal.
8. The invention defined by claim 7 wherein said metal is aluminum.
9. A resistor with reduced susceptibility to failure due to electromigration comprising:
   a resistive element having a positive and negative end;
   terminal means connected to the positive and negative ends of said element;
   means for decreasing current density at the positive end of said resistor; and
   including a substrate and said resistive element is cermet material deposited on the surface of said substrate, the positive end of said cermet resistive element and its associated terminal is large in width compared to the width of the negative end of said resistive element and its associated terminal.
10. A resistor with reduced susceptibility to failure due to electromigration comprising
   a resistive element having a positive and negative end;
   terminal means connected to the positive and negative ends of said element;
   means for decreasing current density at the positive end of said resistor; and
   including a substrate and said resistive element is cermet material deposited on the surface of said substrate, said cermet material is silicon monoxide.

* * * * *